UNITED STATES PATENT OFFICE.

EDWARD ANDREW PARNELL, OF SWANSEA, COUNTY OF GLAMORGAN, ENGLAND.

FERRATED CAKE OF CHOCOLATE.

SPECIFICATION forming part of Letters Patent No. 335,952, dated February 9, 1886.

Application filed August 1, 1885. Serial No. 173,230. (No specimens.) Patented in England October 15, 1884, No. 13,604.

*To all whom it may concern:*

Be it known that I, EDWARD ANDREW PARNELL, a subject of the Queen of Great Britain, residing at Swansea, in the county of Glamorgan, Kingdom of Great Britain, have invented certain new and useful Improvements in Medicinal Preparations Containing an Oxide of Iron, (for which I have made application for Letters Patent in England, dated October 15, 1884, No. 13,604,) of which the following is a specification.

My invention consists in the making of preparations for medicinal use containing iron in the form of what is known as "black oxide of iron," "artificial magnetic oxide of iron," or "ferroso-ferric oxide," by which are understood combinations of ferric oxide with ferrous oxide. The two last-named oxides are capable of uniting together in various proportions, thus forming chemical compounds, all of which are black and affected by the magnet.

To all such black oxides of iron made in the humid way my improvements herein described relate.

The medicinal and hygienic value of these ferroso-ferric oxides is well known; but an inconvenience attends the use of all such oxides as commonly prepared, arising from their property of acquiring an aggregated or gritty form when (after being precipitated and washed in the usual way) they are dried at a moderate heat (as prescribed in the British Pharmacopœia of 1867) or even when dried at ordinary atmospheric temperature. It is well known that after these oxides have been once dried, and have thus acquired the gritty form, their medicinal value is considerably diminished; hence has arisen the practice of avoiding the desiccation of the oxide and of administering it in suspension in water with agitation, as in the form known as "Mercer's magnetic oxide of iron."

By my improvements I obtain a mixture of the oxide with solid or viscous materials to serve the purpose of an inert vehicle or basis in the more convenient form of pastilles, lozenges, tablets, jujubes, or pills, all of which are so prepared that the oxide retains its finely-divided state similar to that of the undried precipitate.

I am well aware that freshly-precipitated carbonate of iron and other non-magnetic materials have been mixed with sugar and other materials while still moist to form them into cakes, but this I believe has been done in order to more easily and thoroughly mix the ingredients, and, except for convenience, the materials might just as well have been mixed dry; but in the case of magnetic oxide, owing, probably, to the magnetic nature of the material, no sooner is the water eliminated which had kept the fine particles in suspension and separated from each other than these come into close contact, magnetic force aiding the natural cohesion, and it is impossible to separate them again into the fine state of subdivision that they were in before drying. Even if magnetic oxide be mixed in the moist state with sugar solution, and then dried, the magnetic oxide is found to be injured, as the particles aggregate in drying unless very largely diluted; but when mixed with glycerine—a material which always remains liquid at ordinary temperatures—the magnetic oxide molecules appear to be separated by the films of glycerine between them, even in the apparent solid chocolate and gelatine cakes, and thus are unable to cohere. Even if this be not the case, and there are no liquid films in the mass, the effect is the same, for whereas sugar in drying separates into solid crystals, leaving the magnetic oxide particles around them to cohere on drying, the glycerine and gelatine I use do not crystallize; but even when solidifying they go gradually from the liquid to the viscid state and from that to the solid without separation of crystals, and still surrounding the molecules of oxide as if still liquid.

In carrying out my invention I proceed as follows: I prepare chocolate cakes or tablets containing such magnetic oxide in the following manner. The oxide is prepared by precipitation in the usual way and washed, but before being dried I mix it with glycerine in the proportion of three and a half to four parts of glycerine with a quantity of wet oxide containing four parts of the oxide in a dry state, and dry the mixture at or under the temperature of about 212° Fahrenheit. When dry, but with the glycerine still liquid, of course, I prefer to add to this mixture a small quantity of hot and rather strong solution of gelatine; but this gelatine is not absolutely necessary, and while warm introduce this mixture into warm chocolate paste made in the usual way with roasted cocoa, sugar, and vanilla, or other flavoring. After thorough incorporation the warm mixture is run into molds in the usual way. A convenient proportion of the oxide and glycerine mixture is six parts (containing three of the dry magnetic oxide) to one hundred parts of the chocolate paste. In the chocolate tablets thus made the magnetic oxide is preserved in the highly-divided state, which is very important for its proper medicinal activity.

I claim as my invention—

1. The process, substantially as herein described, for making medicinal chocolate cakes or tablets containing a magnetic oxide of iron, which consists in adding glycerine to the fresh precipitated oxide, evaporating the water, adding hot solution of gelatine, and then warm chocolate paste with flavoring, and when thorough incorporation has taken place running it into molds.

2. The improvement in the process of making medicinal chocolate cakes or tablets containing a magnetic oxide of iron, which consists in adding glycerine to the fresh precipitated oxide and evaporating the water, whereby a mud of glycerine magnetic oxide in a very finely-divided condition is obtained without aqueous matter and without the aggregation of particles consequent in drying the original precipitate without glycerine.

3. As a new article of manufacture, a chocolate cake containing glycerine and magnetic oxide of iron in a very fine state of subdivison, substantially in the proportions specified.

In testimony whereof I have signed my name to this specification in the presence of two subscribing witnesses.

EDWARD ANDREW PARNELL.

Witnesses:
HENRY LEAKEY,
GEORGE BATH.